United States Patent
Argyriou et al.

(10) Patent No.: US 9,432,146 B2
(45) Date of Patent: Aug. 30, 2016

(54) METHOD FOR COMMUNICATION IN A WIRELESS NETWORK AND COMMUNICATION DEVICE

(75) Inventors: Antonios Argyriou, Eindhoven (NL); Ashish Vijay Pandharipande, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 186 days.

(21) Appl. No.: 13/143,436

(22) PCT Filed: Jan. 5, 2010

(86) PCT No.: PCT/IB2010/050016
§ 371 (c)(1),
(2), (4) Date: Jul. 6, 2011

(87) PCT Pub. No.: WO2010/079438
PCT Pub. Date: Jul. 15, 2010

(65) Prior Publication Data
US 2011/0268099 A1    Nov. 3, 2011

(30) Foreign Application Priority Data
Jan. 7, 2009  (EP) ...................................  09305010

(51) Int. Cl.
*H04W 4/00*    (2009.01)
*H04L 1/18*    (2006.01)
(Continued)

(52) U.S. Cl.
CPC ............. *H04L 1/18* (2013.01); *H04B 7/15521* (2013.01); *H04L 2001/0097* (2013.01)

(58) Field of Classification Search
USPC ........................................................ 370/338
See application file for complete search history.

(56) References Cited

U.S. PATENT DOCUMENTS

2003/0039226 A1    2/2003  Kwak
2003/0102933 A1*   6/2003  Partanen ......................... 333/18
(Continued)

FOREIGN PATENT DOCUMENTS

EP           1764961 A1    3/2007
WO     WO2009113031 A2    9/2009

OTHER PUBLICATIONS

Embracing Wireless Interference: Analog Network Coding Sachin Katti, Shyamnath Gollakota, and Dina Katabi Copyright 2007.*

(Continued)

*Primary Examiner* — Huy D Vu
*Assistant Examiner* — Kevin Cunningham
(74) *Attorney, Agent, or Firm* — Larry Liberchuk

(57) ABSTRACT

The invention relates to a method for communication between nodes in a wireless network further comprising a router node (2), comprising :
a first (1) and second (3) transmitting nodes sending a first (a(t)) and second (b(t))data signals to be respectively transmitted to a first (4) and second (5) receiving nodes,
the router node (2) receiving a mixed signal (MDATA[a, b](t)) resulting from interference of the first (a(t)) and second (b(t)) data signals, and sending respectively to the first (4) and second (5) receiving nodes a first and second router analog acknowledgment signals comprising information representative of the hearing duration during which the mixed signal has been received by the router node,
the router node (2) sending the mixed signal(MDATA[a, b](t)) to the first (4) and the second (5) receiving nodes,
the first (4) and second (5) receiving nodes decoding the mixed signal, based on the respective router analog acknowledgment signals.
The invention also relates to a communication device and a network therefor.

13 Claims, 3 Drawing Sheets

(51) Int. Cl.
*H04B 7/155* (2006.01)
*H04L 1/00* (2006.01)

(56) References Cited

U.S. PATENT DOCUMENTS

| | | | |
|---|---|---|---|
| 2004/0181709 A1* | 9/2004 | Gibson et al. | 714/25 |
| 2006/0115084 A1* | 6/2006 | Ryu | 380/247 |
| 2008/0037465 A1 | 2/2008 | Ngo | |
| 2008/0075080 A1 | 3/2008 | Katabi | |
| 2008/0132234 A1 | 6/2008 | Gilliland | |
| 2008/0298306 A1* | 12/2008 | Larsson | 370/328 |

OTHER PUBLICATIONS

Complexity of Scheduling with Analog Network Coding Olga Goussevskaia, Roger Wattenhofer Publisher: ACM, New York@2008.*

Antonios Argyriou, "Network Coding in IEEE 802.11 Wireless LANs with an Enhanced Channel Access Scheme", Global Telecommunications Conference, 2008. IEEE GLOBECOM 2008. IEEE, IEEE, Piscataway, NJ, USA, Nov. 30, 2008, pp. 1-5, XP031369733.

S. Katti et al., "XORs in the Air: Practical Wireless Network Coding", SIGCOMM, pp. 243-254, 2006 http://piper.csail.mit.edu/papers/copesc.pdf.

Koetter R. et al., "An Algebraic Approach to Network Coding", IEEE/ACM Trans. on Networking, pp. 1-28, 2003 http://www.mit.edu/~medard/newpapers/04_2.pdf.

Li Q. et al., "Performance analysis of the IEEE 802. 11e Block ACK Scheme in a Noisy Channel", IEEE, 0-7803-0277, 2005, pp. 551-557.

Harada S. et al., "A Study on Two-Way Traffic Integrated Transmission using Network Coding Scheme in Multi-hop Wireless Network", The Institute of Electronics, Information and Communication Engineers, IEICE Technical Report, pp. 7-12, 2006.

* cited by examiner

METHOD FOR COMMUNICATION IN A WIRELESS NETWORK AND COMMUNICATION DEVICE

FIELD OF THE INVENTION

The present invention relates to wireless communication networks and more precisely to a method for communication between nodes in such network.

This invention is, for example, relevant for sensor networks, personal area networks, local area networks, metropolitan area network or any other kind of wireless networks.

BACKGROUND OF THE INVENTION

Conventional wireless networks are designed to prevent transmissions between the different nodes from interfering one with the others, for example by including techniques using reservation of wireless channels by time division or frequency division.

Transmissions in such systems can be, for example, performed using digital network coding (DNC) to increase capacity. An example use of DNC is shown in FIG. 1a and FIG. 1b, where two nodes A and B willing to exchange signals using DNC transmit sequentially signals a(t) and b(t), under the form of digital packets a and b, to a router node R. After having completely received packets a and b, the router node mixes the content of the packets, for example by linear combination, and broadcasts to destination devices a digital signal, corresponding to the algebraic combination a+b.

It has been noticed that these networks present major drawbacks in terms of transmission capacity, since signals a and b have to be transmitted sequentially. Solutions have thus been proposed, using interferences of analog signals to allow concurrent transmissions. Accordingly, it has been recently proposed to use the analog counterpart of DNC, which is the analog network coding (ANC). An exemplary use of such coding can be seen in FIG. 1c, where nodes A and B simultaneously transmit packets to the router node R, under the form of analog signals Data[a](t) and Data[b](t). Signals mix naturally over the wireless channel, due to interference, and thus the router node R receives a mixed signal MData[a,b](t), which is then forwarded to the destination nodes without the contained packets being decoded or recovered at the router node. Then, destination nodes that are aware of the mixing process can successfully recover the desired packets.

However, in existing systems carrying out analog network coding, major drawbacks have appeared, namely in terms of feedback and acknowledgment of the transmissions. Indeed, in known systems, destination nodes can not determine, before receiving an interfered signal, whether they are, or not, able to decode such a signal. Moreover, there is no mechanism for the router node and the transmitting nodes to know whether decoding has been successfully performed, and thus whether transmission has been fully completed.

SUMMARY OF THE INVENTION

It is an object of the invention to propose a communication method overcoming at least some of the drawbacks above-mentioned.

It is another object of the invention to provide a method for cooperative transmissions between nodes in a wireless network.

It is also an object of the invention to provide a method that can be implemented benefiting from additional mechanisms such as opportunistic listening.

In addition, it is an object of the invention to provide a method that can be carried out in any type of network comprising a communication device acting as a router node and any numbers of communication devices acting as regular transmitting nodes.

To this end, a method for communication between nodes in a wireless network further comprising a router node in accordance with the invention comprises the following steps:
- a first and second transmitting nodes send a first and second data signals to be respectively transmitted to a first and second receiving nodes,
- the router node receive a mixed signal resulting from interference of the first and second data signals, and send respectively to the first and second receiving nodes a first and second router analog acknowledgment signals comprising information representative of the hearing duration during which the mixed signal has been received by the router node,
- the router node sends the mixed signal to the first and the second receiving nodes,
- the first and second receiving nodes decode the mixed signal, based on the respective router analog acknowledgment signals.

Such a method allows receiving nodes, based on the analog acknowledgment signals, to check whether the mixed signal that might be issued from interference between the first and second data signals is possible to decode. This checking is performed before the mixed signal is forwarded by the router node. Accordingly, this method helps optimizing analog network coding decisions, since the receiving nodes determine, early in the transmission process, whether they should allow the reception of interfered signals or if they should fall back to regular "non-interfered/un-mixed" transmission mode.

According to an embodiment of the invention, information representative of the hearing duration for which the mixed signal has been received by the router node comprises the exact duration, or comprise the start time and end time of hearing.

This method may be carried out in different network architectures. Accordingly, in an exemplary embodiment, the first and second receiving nodes are, respectively, the second and first transmitting nodes, and the decoding of the mixed signal is performed by using the first and second data signals stored in the first and second transmitting nodes. In another embodiment, the first and second receiving nodes are situated respectively in the neighborhood of the second and first transmitting nodes, and the decoding of the mixed signal is performed by using the first and second signal overheard by the first and second receiving nodes by opportunistic listening.

Opportunistic listening is a mechanism in which a node listens to all packets in is neighborhood, and stores all heard packets for a limited time.

In the present application, the first and second receiving nodes send, upon overhearing the first and second data signals, respective listening analog acknowledgment signals to the router. In order to avoid useless transmission, in an exemplary embodiment, the mixed signal is sent only upon receipt of the first and second listening analog acknowledgment signals.

Existing systems also present drawbacks in that, in case a destination node of a data signal fails to successfully recover the desired packet from the mixed signal, no feedback mechanism is provided, thus leading to high error rate in the transmissions.

The present invention thus comprises, in an example embodiment, a step for the first and second receiving nodes, upon correct decoding of the mixed signal, of sending a first and second final acknowledgement signals to the router node.

In a particular embodiment, the router node forwards the first final acknowledgment signal, respectively the second, to the first transmitting node, respectively the second, as an analog signal.

In this case, the transmitting nodes know whether the data signal has been received, and if not, they can carry out adjustment mechanisms, for example by re-sending the packet that was not successfully recovered.

In another particular embodiment, the first and second data signals comprise preambles decoded by the router node, thus allowing identification of the first and second data signals.

In such an embodiment, the first and second router analog acknowledgment signals may further comprise the time shift between the first and second data signals.

The present invention also relates to a communication device comprising
- means for receiving data signal from other communication devices in the network,
- means for generating, upon receipt of a data signal, a router analog acknowledgment signal comprising a start time and end time of hearing the data signal,
- means for receiving and forwarding analog acknowledgment signals from and to the nodes.

Yet another aspect of the invention relates to a network comprising a communication device as described before, acting as a router node, and at least two other communication devices, acting as regular nodes.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 3 is a time diagram showing a sequence of a method according to the invention, corresponding to the architecture shown on FIG. 2a.

DETAILED DESCRIPTION OF THE INVENTION

The present invention relates to a method for communication between communication devices corresponding to regular nodes, in a network further comprising a router node.

Figure 1A:
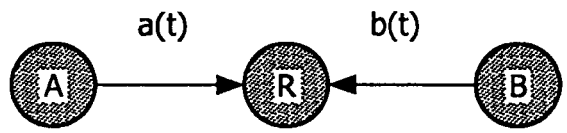
FIG. 1a, 1b and 1c, already described, show conventional Digital Network Coding and Analog Network Coding sequences.
Figure 1B:
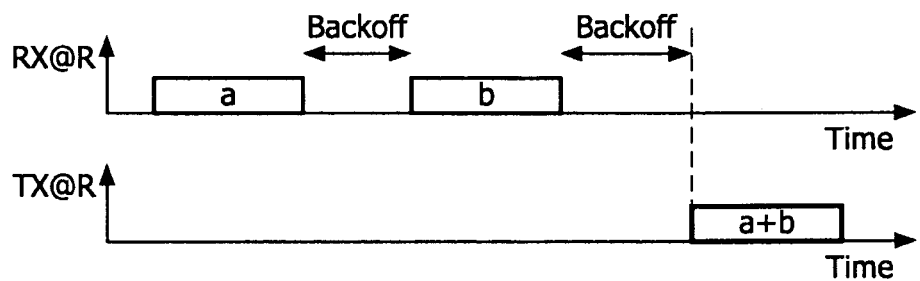
Figure 1C:
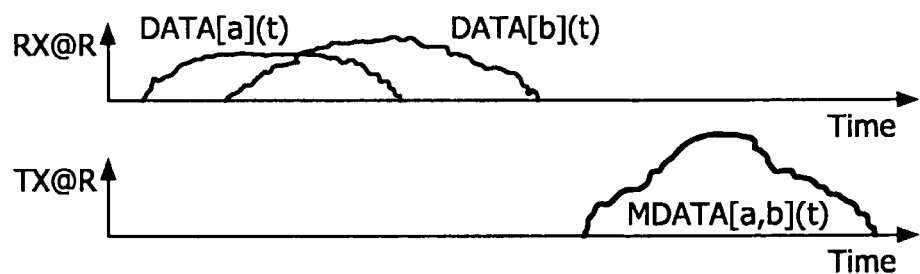
Figure 2A:
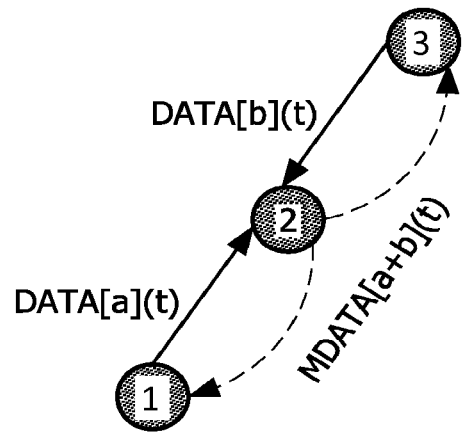
FIG. 2a and FIG. 2b show different architectures of networks wherein transmissions are performed using a method according to the invention.
Figure 2B:
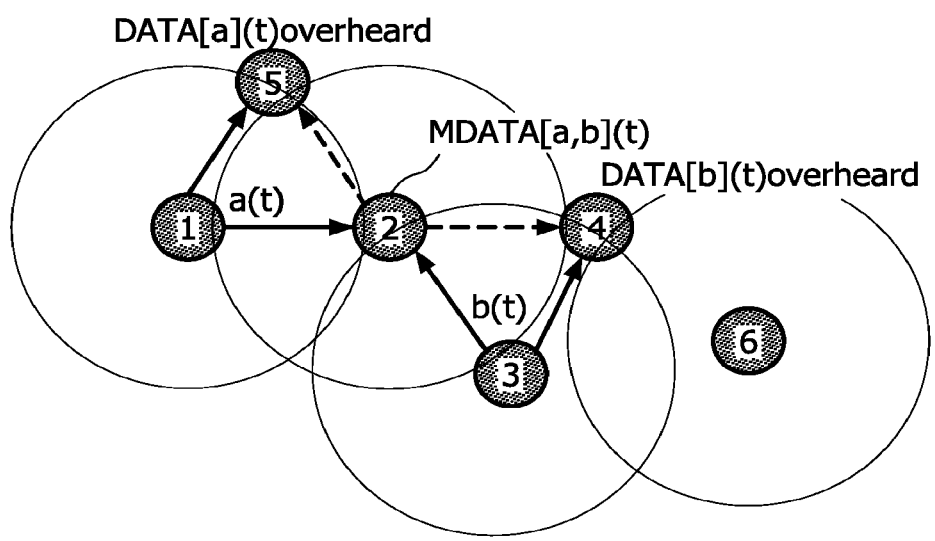

Examples of network architectures in which such a method can be applied are shown on FIGS. 2a and 2b.

Both architectures comprise a router node 2, and first and second transmitting nodes, referenced as 1 and 3. Those networks also comprise first and second receiving nodes, as follows:
- in the first architecture, shown on FIG. 2a, the first and second receiving nodes correspond, respectively, to the second and first transmitting nodes,
- in the second architecture, on FIG. 2b, the first and second receiving nodes, referenced as 4 and 5, are distinct from the first and second transmitting nodes.

Figure 3:
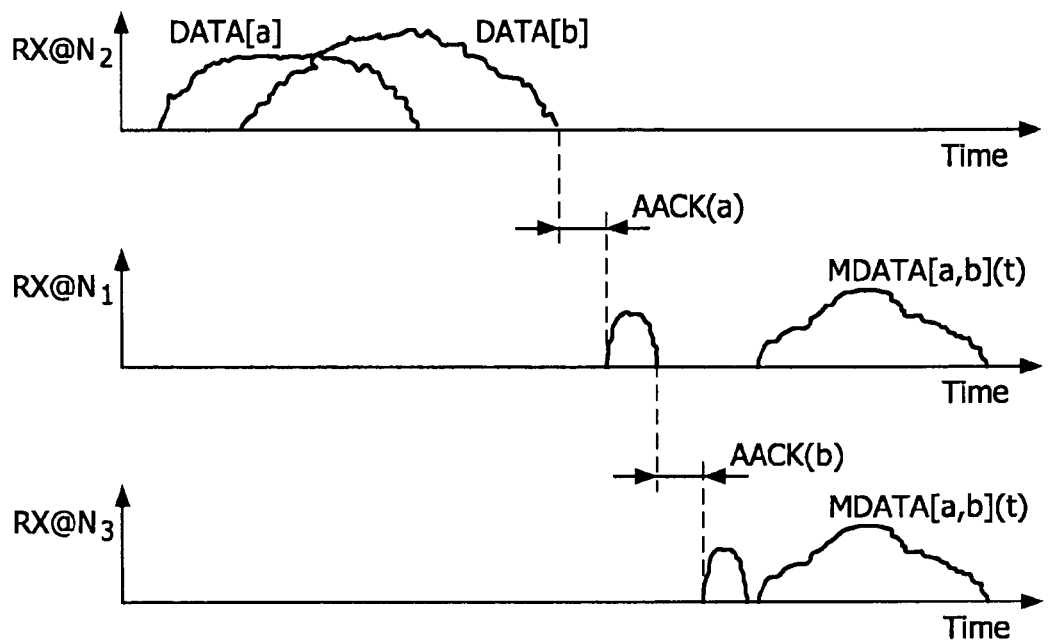

A method according to the invention is such that transmitting nodes 1 and 3 can concurrently send respective message a(t) and b(t) to the router node 2. Since analog network coding is used, those messages are sent under the form of analog signals Data[a](t) and Data[b](t). This concurrent transmission to the router node 2 can be seen on the first diagram of FIG. 3, relating to the first network architecture.

The router node 2 allows both analog signals to interfere, and then a mixed signal MData[a,b](t) is formed.

The router node 2 determines the duration, and/or the start time and end time of hearing the mixed signal. Based on this information, the router node 2 generates two router analog acknowledge signals AACK(a) and AACK(b) that are respectively transmitted to the first and second receiving nodes 1 and 3.

We will now describe the rest of the method by differentiating between the first and second architecture.

In the first architecture, the first transmitting node sends signal a(t) to the first receiving node, who is actually the second transmitting node, and the second transmitting node send signal b(t) to the second receiving node, who is actually the first transmitting node. After having sent the router analog acknowledgment signals to the receiving nodes, the router node 2 forwards them the mixed message MData[a,b](t).

Accordingly, in this case, node 3 gets the following elements:
- the mixed signal MData[a,b](t) received from the router node,
- an analog acknowledgment signal indicating the duration of the router node hearing the mixed signal,
- the starting and ending time of transmitting b(t), since it has been transmitted by itself,
- the transmission delay between two transmissions, since this delay is predetermined or can be determined by other protocols in the network, which makes it possible for node 3 to determine the transmission chronology between the first and second data signals.

Thus, based on all these elements, node 3 performs analog decoding by subtracting signal Data[b](t) from the mixed signal MData[a,b](t) to recover the initial message a(t) sent by node 1. Similar process is performed by node 1 to decode and recover signal b(t) sent by node 3.

Now let's consider the second architecture, shown on FIG. 2b, where the receiving nodes 4 and 5 differ from the transmitting nodes 1 and 2. In this case, the receiving nodes do not store any of the signals a(t) and b(t), since those signals are sent by different nodes. Thus, it is impossible to decode the interfered signal MData[a,b](t). To solve this issue, in one embodiment of the invention, it is proposed to carry out a mechanism of opportunistic listening as described herein after. Node 5, who is the destination node of the signal b(t) sent by node 3, is situated in the neighbourhood of nodes 1 and 2. Thus, when node 1 transmits signal a(t) to node 2, node 5 might overhear signal transmission between 1 and 2, and thus obtain a(t). When hearing a(t), node 5 may then send a listening analog acknowledgment signal to the router node.

Similar opportunistic listening may occur at node 4, who overhears signal b(t) when transmitted from node 3 to node 2.

When the router node has received both listening analog acknowledgment signals from nodes 4 and 5, it means that decoding of the interfered signal by these nodes is possible. Thus the router node allows mixing of signals and then forwards MData[a,b](t) to nodes 4 and 5.

Receiving nodes 4 and 5 then decode MData[a,b](t) using an analog decoding system.

In both architectures, upon successful decoding of the interfered message, receiving nodes respectively send a final acknowledgment signal to the router node, to indicate successful completion of the transmission process. The router node then forwards those final acknowledgment signals to the initial transmitting nodes.

In case the receiving nodes fail to successfully recover the data packets, the router node is aware of this failure.

A method according to the invention is not restricted to the architectures above-described, and can be carried out in any wireless network comprising at least one communication device acting as a router node and at least two communication devices acting as regular node, wherein:

The router node includes some or all of the following features:
- means for allowing signal transmissions received from regular nodes to interfere,
- means for generating and transmitting router analog acknowledgment messages, containing information about the analog signals it has heard,
- means for forwarding acknowledgment signals received from a regular node to another regular node,
- means for decoding a preamble of data packets, and thus for determining the source of each message received in the interfered signal.

In some specific embodiments, a router node may neither generate nor transmit any other type of acknowledgment signal than the router analog acknowledgment signal containing a start time and end time of hearing an analog signal.

A regular node includes some or all of the following features:
- means for transmitting complete data packets, or data signals, to other nodes,
- means for storing data signals, before and after transmission, for example for use during further analog decoding,
- means for transmitting listening analog acknowledgment signal in case a data signal has been overheard thanks to opportunistic listening.

A method according to the invention may be, for example, implemented in a network comprising one router node and three regular nodes, where one of the regular nodes is both a transmitting and receiving node, and the two others only have one role, namely transmission or reception.

In another exemplary embodiment, let's assume that a network comprises three nodes A, B and C, transmitting messages in a circular way, i.e. node A transmits a message to node B, node B transmits a message to node C, and node C transmits a message to node A.

In such a case, the router node generates three analog acknowledgment signals, comprising information representative of the starting time and ending time of transmissions of each signal, so that each node may determine the contribution of the three signals in the resulting interfered signal.

Figure 4:
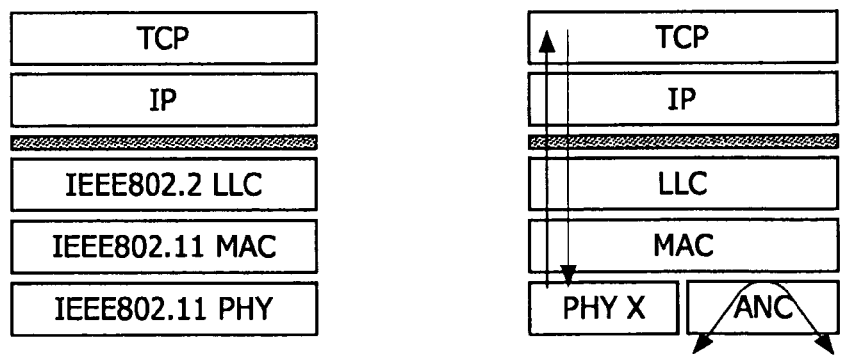
FIG. 4 shows a typical implementation of an 802.11-based WLAN, and system with the ANC.

FIG. 4 shows the comparison between a typical implementation of 802.11-based wireless local area networks (WLAN), on the left side, and a system implementing Analog Network Coding. As can be seen on the right side, when ANC is implemented in the protocol stacks, there are two possibilities for packets flows, indicated by the arrows.

The present invention is particularly useful in applications where energy consumption is critical, because, as can be seen in FIG. 4, much of the processing is done in analog domain by intermediate router nodes, which in turn can reduce energy consumption.

The present invention is more especially dedicated to sensor networks such as medical networks or home lighting networks, but also to any type of wireless systems such as PAN, LAN and MAN.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of wireless communications and which may be used instead of or in addition to features already described herein.

The invention claimed is:

1. A method for communication between nodes in a wireless network further comprising a router node, the method comprising:
   - a first and second transmitting nodes sending a first and second data signals to be respectively transmitted to a first and second receiving nodes,
   - the router node receiving a mixed signal resulting from interference of the first and second data signals, determining a transpired hearing duration during which the router node received the mixed signal, and sending respectively to the first and second receiving nodes a first and second router analog acknowledgment signals comprising information representative of the transpired hearing duration,
   - the router node sending the mixed signal to the first and the second receiving nodes, and
   - the first and second receiving nodes decoding the mixed signal, based on the respective router analog acknowledgment signals.

2. The method as recited in claim 1, wherein the transpired hearing duration comprises an exact duration, or a start time and an end time, of hearing.

3. The method as recited in claim 1, wherein the first and second receiving nodes are, respectively, the second and first transmitting nodes, and wherein decoding of the mixed signal is performed by using the first and second data signals stored in the first and second transmitting nodes.

4. The method as recited in claim 1, wherein the first and second receiving nodes are situated respectively in the neighborhood of the second and first transmitting nodes, and the decoding of the mixed signal is performed by using respectively the first and second signal overheard by the first and second receiving nodes by opportunistic listening.

5. The method as recited in claim 4, wherein the first and second receiving nodes send, upon overhearing the first and second data signals, respective listening analog acknowledgment signals to the router node.

6. The method as recited in claim 4, wherein the sending the mixed signal is performed upon receipt of the first and second listening analog acknowledgment signals.

7. The method as recited in claim 1, further comprising amplifying the mixed signal before sending the mixed signal to the first and second receiving nodes.

8. The method as recited in claim 1, further comprising the first and second receiving nodes, upon correct decoding of the mixed signal, sending a first and second final acknowledgement signals to the router node.

9. The method as recited in claim 8, further comprising the router node forwarding the first final acknowledgment signal, respectively the second final acknowledgment signal, to the first transmitting node, respectively the second transmitting node, as an analog signal.

10. The method as recited in claim 1, wherein the first and second data signals comprise preambles decoded by the router node, thus allowing identification of the first and second data signals.

11. The method as recited in claim 10, wherein the first and second router analog acknowledgment signals further comprise a time shift between the first and second data signals.

12. A communication system for communication between nodes in a wireless network, the system comprising:
   a first and second transmitting nodes configured to respectively send a first and second data signals to a first and second receiving nodes, and
   a router node configured to receive a mixed signal resulting from interference of the first and second data signals, determine a transpired hearing duration during which the router node received the mixed signal, and send respectively to the first and second receiving nodes a first and second router analog acknowledgment signals comprising information representative of the transpired hearing duration,
   wherein the router node is further configured to send the mixed signal to the first and the second receiving nodes, and
   wherein the first and second receiving nodes are configured to decode the mixed signal, based on the respective router analog acknowledgment signals.

13. A device for use in a wireless network including a plurality of nodes, the device comprising:
   a memory; and
   a processor configured to:
      receive a mixed signal resulting from interference of a first data signal and a second data signal;
      determine a transpired hearing duration during which the mixed signal was received;
      send the mixed signal to a first receiving node and a second receiving node;
      generate a first analog acknowledgment signal and a second analog acknowledgment signal, the first and second analog acknowledgment signals each comprising information representative of the transpired hearing duration; and
      send the first and second analog acknowledgement signals to the first and second receiving nodes, respectively.

* * * * *